United States Patent
Stearns

[11] 3,829,020
[45] Aug. 13, 1974

[54] TRANSLATING SLEEVE VARIABLE AREA NOZZLE AND THRUST REVERSER

[75] Inventor: Gabriel E. Stearns, Mercer Island, Wash.

[73] Assignee: The Boeing Company, Seattle, Wash.

[22] Filed: June 13, 1973

[21] Appl. No.: 369,697

[52] U.S. Cl.... 239/265.13, 181/33 HD, 239/265.29
[51] Int. Cl............................................ B64d 33/06
[58] Field of Search..... 239/265.13, 265.11, 265.29; 181/33 HD, 33 HB, 33 H

[56] References Cited
UNITED STATES PATENTS

| | | | |
|---|---|---|---|
| 2,418,488 | 4/1947 | Thompson | 239/265.13 UX |
| 3,084,507 | 4/1963 | Kleinhans et al. | 239/265.13 X |
| 3,570,769 | 3/1971 | Freeman | 239/265.13 X |
| 3,637,042 | 1/1972 | Raynes | 181/33 HD X |

Primary Examiner—M. Henson Wood, Jr.
Assistant Examiner—Michael Y. Mar
Attorney, Agent, or Firm—H. Gus Hartmann; Glenn Orlob

[57] ABSTRACT

A variable area discharge nozzle and thrust reversing mechanism for a jet engine wherein an annular exhaust nozzle having a telescopic sleeve, forms the aft section of the exhaust nozzle duct and a fixed plug centerbody is mounted within the duct. For the low speed takeoff and landing mode of airplane operation, the aft section of the exhaust duct is translated rearward thereby withdrawing in combination, a telescopic sleeve section having cascade vanes and an internal cover for the cascade vanes. With the cascade vanes and cover in the aft position, the overall length of the exhaust duct is extended and through the contoured centerbody and inner duct wall, the exhaust nozzle exit area is increased. Also, in this position the cascades are exposed externally and the thrust reversing mechanism is in the armed position, To reverse the thrust the cover under the cascade vanes is slid forward to expose them and through an interconnecting linkage mechanism, a blocker door downstream of the cascade vanes, blocks the rearward flow of the exhaust fluid and causes it to exhaust through the cascade vanes. As an additional embodiment, for sound suppression, a plurality of acoustically treated struts are hinged to and retract into the centerbody for stowage, and are radially extended into the exhaust duct flow for the sound suppression mode.

6 Claims, 7 Drawing Figures

TRANSLATING SLEEVE VARIABLE AREA NOZZLE AND THRUST REVERSER

SUMMARY OF THE INVENTION

The invention relates to a variable area exhaust nozzle and thrust reverser for a jet engine and more particularly, to an annular exhaust nozzle having: a telescoping sleeve section which forms the aft section of the exhaust nozzle duct; and a fixed plug centerbody mounted within the duct.

The sleeve is internally contoured and by the axial movement thereof, in relation to fixed plug centerbody which is also contoured and a conical surface of revolution, the exhaust nozzle exit area is varied and at the same time, the internal exhaust duct flow area is maintained convergent toward the nozzle exit for an efficient subsonic airplane exhaust nozzle design.

For low speed takeoff and landing mode of airplane operation, the aft section of the exhaust duct is translated aft thereby withdrawing in combination, a telescopic sleeve section having cascade vanes and an internal cover for the cascade vanes.

With the cascade vanes and cover in the aft position, the overall length of the exhaust duct is extended and through the contoured centerbody and inner duct wall, the exhaust nozzle exit area is increased. Also, in this position, the thrust reversing mechanism is in the armed position. To reverse the thrust, the cover under the cascade vanes is slid forward to expose them and through an interconnecting linkage mechanism, a blocker door downstream of the cascade vanes, blocks the rearward flow of the exhaust fluid and causes it to exhaust through the cascade vanes.

By extending the sleeve aft to the large nozzle area and low noise position of the sleeve, the internal duct wall length is increased thereby providing additional area for acoustic lining and noise attenuation capability.

As an additional embodiment, a plurality of acoustically treated radial struts are hinged on the centerbody and are deployed to extend radially into the exhaust flow for sound suppression, by the aft extension of the sleeve.

The primary function of sleeve movement is to vary the area and a secondary function is to arm the reverser mechanism and expose the cascade vanes to the external airstream flow. These two functions are compatible with the airplane operational requirements in that the nozzle area is increased as required during the slow flight segments, when the airplane is close to the ground (ascent and descent) when engine noise attenuation is required; during slow flight, drag from cascades exposed to outside airflow is insignificantly low compared to the drag of the cascade vanes exposed at cruise speed and cruise altitude. At cruise however, the nozzle sleeve is retracted for the small nozzle area and the outside of the cascade vanes are stowed.

Cruise drag is additionally reduced by decreasing the total nacelle wetted area which is the area exposed to the outside airflow. In addition, the internal losses of the nozzle are also reduced by decreasing the internal wetted area of the nozzle. Thus an improved cruise thrust is provided.

In the new generation of subsonic jet airplanes, with environment and noise becoming of prime importance, it will be necessary to provide for area variation on the conventional type of convergent exhaust nozzles, in order to improve the noise suppression capability. The requirement will be for a larger exhaust nozzle area at the low airplane speed conditions in order to provide lower exhaust velocities at takeoff/climb and approach/landing conditions. For high speed cruise operation, a smaller exhaust nozzle area will be required in order to provide acceptable specific fuel consumption and engine cycle requirements at high altitude. The exhaust nozzle area variation for efficient high and low speed operation, will also be necessary for supersonic airplanes with convergent-divergent and after-burning nozzles.

The most generally known method for varying the exit area of an annular nozzle, is by translating a centerbody or plug. This method generally locates all of the actuating mechanisms along the exhaust/engine centerline, which is a very high temperature area since it is surrounded by the primary exhaust flow; and therefore this results in the structure and actuator mechanisms being very heavy.

Another known method for varying the exhaust area comprises a series of segments or bird-feathers, located around the outer periphery of the nozzle which are collapsed for reducing the outer diameter of the annulus. Whereas in the present invention, the outer shell of the translating sleeve structure is of a continuous load bearing hoop structure with no movable flaps or bird-feathers. Further, the prior art peripheral segments produce a detrimental base drag when they are positioned to the smaller exhaust nozzle exit area for operating the airplane at the high speed cruise condition.

One of the objects of the invention is to provide a convergent fluid flow exhaust duct for both the high speed cruise position and the low speed takeoff and landing position, of a fixed inner centerbody plug with a translating outer sleeve type exhaust duct nozzle.

Another object is to arm a cascade vane reversing mechanism when the exahsut nozzle is at its low speed takeoff and landing position whereat the nozzle has the greater exhaust area for the sound suppression mode of operation.

Another object is to add acoustic material to the inner surface of the cascade vane cover for additional noise suppression.

Another object is to deploy a series of acoustically treated struts for improved noise attenuation at the low speed mode.

One of the advantages of the telescopic extension of the aft outer wall section or primary sleeve of the exhaust duct, in combination with the increased exhaust nozzle exit area for the low speed and sound suppression mode of operation, is that the overall duct length is increased; and with an acoustic lining on the interior of the duct and telescopic elements throughout the increased duct length, the noise suppression capability is increased. Whereas for a fixed duct structure having a translating centerbody, the overall length of the duct would remain the same. Further, this additional acoustically treated area that is made available by the increased duct length, is only utilized during the low speed and close to the ground flight regimes. Therefore, when the primary sleeve is retracted to its minimum length, the duct losses that would result from operating the increased duct length at high speed cruise flight conditions, would be reduced and there would be no losses in nozzle exit performance.

Another advantage of the invention is that a good directional flow control of the reverse thrust gases and their reverse thrust vector direction, can be achieved by varying the peripheral position of the cascade vane flow turning geometry about the exhaust nozzle duct.

These, as well as other objects and advantage of the invention, will be more clearly understood from the following description when read with reference to the accompanying drawings.

DESCRIPTION OF THE PREFERRED EMBODIMENTS

Figure 1:
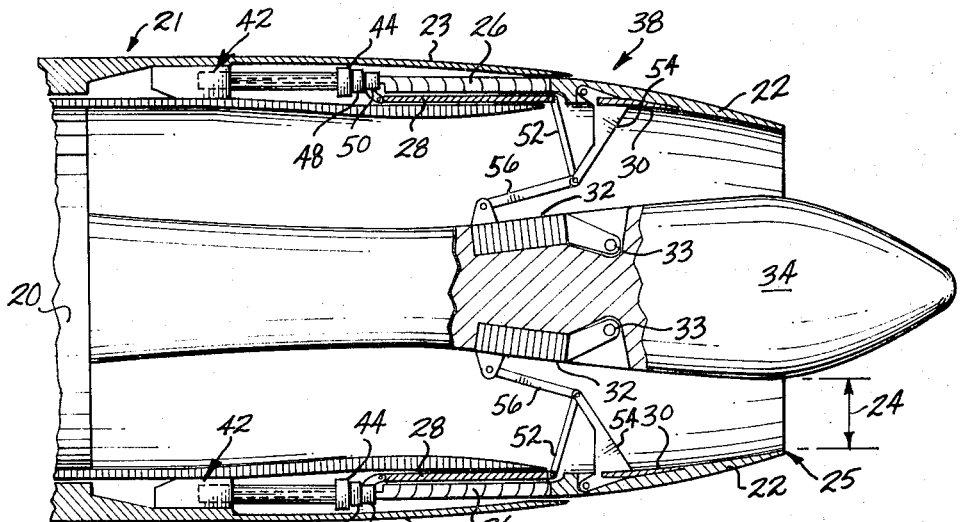
FIG. 1 is a side view of an annular engine exhaust nozzle section with the variable area nozzle in the forward stowed or cruise position.
Figure 2:
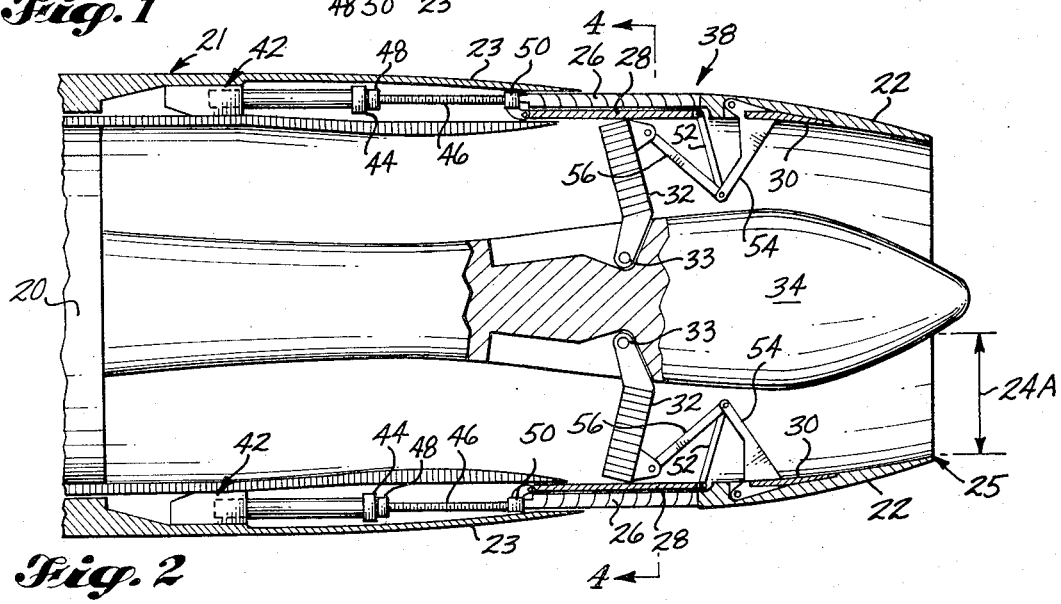
FIG. 2 is a side view similar to FIG. 1 with the aft nozzle wall translated aft to the increased nozzle exhaust area position in combination with the radial extension of sound suppression struts for the takeoff and landing mode of airplane operation.
Figure 3:
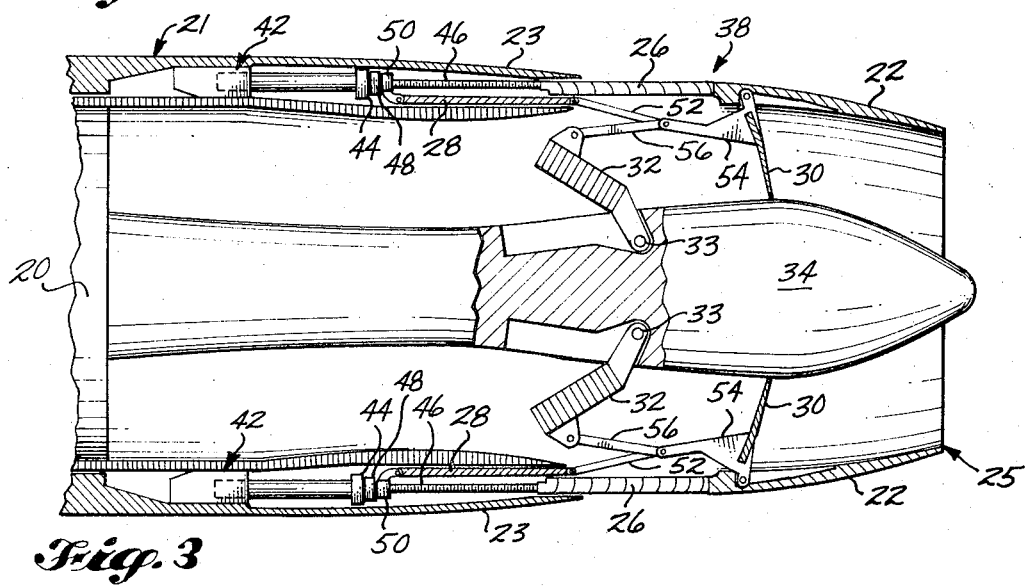
FIG. 3 is a side view similar to FIG. 2 with the cover under the cascade vanes removed in combination with raising a blocker door into position for thrust reversing action.

FIGS. 1–3, are longitudinal sectional views of a preferred embodiment of the present invention showing the exhaust nozzle arrangement and thrust reversing mechanism at the aft end of a high bypass turbofan engine 20 enclosed in a nacelle 21 incorporating an axially translating and internally contoured, circular primary sleeve assembly 38 for varying the exhaust nozzle area. By translating the rear section of the exhaust nozzle or the exterior wall 22 of the engine nacelle 21 aft, the exhaust nozzle exit area 24 is varied as shown by the graphs in FIGS. 6 and 7 (which will be explained infra) and in combination therewith, a circumferential series of cascade vane panels 26 of the thrust reversing mechanism are exposed on the outer surface of the nacelle or nozzle wall. The added drag increment due to the externally exposed cascade vanes 26 is not important during the low speed operation of the aircraft such as at landing or takeoff since the primary purpose of translating the primary sleeve assembly 38 aft, is to achieve a larger exhaust nozzle exit area for the sound suppression mode, in addition to arming the thrust reversing mechanism. Also, the drag effect is negligible due to the low speed flight regime at this nozzle position. However, during the high speed cruise flight operation of the airplane, the drag increment is important as well as providing the desired high speed cruise exhaust nozzle, shown in FIG. 1, with an optimum smaller exit area 24. This is, of course, provided by translating the primary sleeve assembly 38 forward to its retracted position whereat the cascade vanes are covered over and a smooth streamlined surface is presented on the outside of the engine nacelle. Once the aft section 22 of the nacelle or exhaust nozzle wall 21 is translated longitudinally aft as shown in FIG. 2, so as to form the internal contour of the low speed nozzle, with the larger exhaust nozzle exit area 24A, and in combination therewith, the cascade vanes 26 are exposed externally when moved to their armed thrust reversing position. The only additional motion required for going into the reverse thrust mode, is to uncover the interior surface of the cascade vanes 26 and block the flow through the exhaust nozzle. This is done by sliding the cascade vane cover 28 or cylindrical secondary sleeve, forward; and at the same time, blocking the aft fluid flow. This is done by slaving a series of blocker doors 30 off the longitudinal movement of the cascade vane cover 28.

Figure 4:
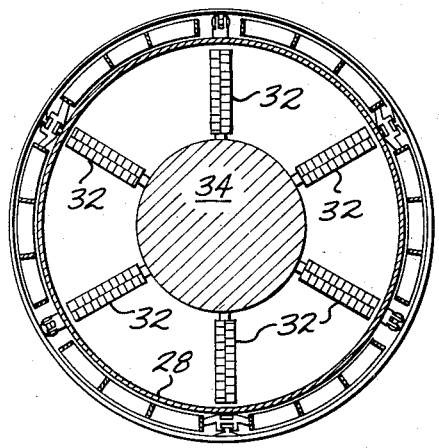
FIG. 4 is a rear view taken along the line 4—4 of FIG. 2 showing the sound suppression struts in their sound suppression position.
Figure 5:
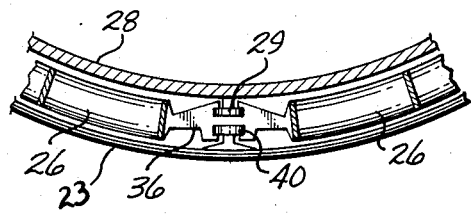
FIG. 5 is an enlarged detail rear view similar to FIG. 4 depicting the continuous load bearing hoop structure of the translating outer sleeve.

FIG. 5 is an enlarged detail section of the duct wall in FIG. 4 and shows the peripheral cascade vane panels 26 structurally interconnected by a roller track member 36 to form a continuous cylindrical hoop structure which is more efficient stresswise. This structurally continuous cylindrical sleeve of cascade vane panels 26 and track members 36 in combination with the aft outer wall section of the exhaust nozzle duct 22, forms the primary translating sleeve assembly 38. The cylindrical sleeve comprising the cascade vane panels 26 and track members 36, is a very highly loaded hoop tension member when in the thrust reversing mode and will retain its diametric dimensions so that it doesn't vary substantially as an intermeshing finger type thrust reverser arrangement would, or one that has annular breaks or cuts in it. The cascade vane panels 26 which form part of the extension of the primary sleeve assembly 38, are translated on rollers 40 which are mounted to fixed nacelle structure 23. The cascade vane cover or secondary sleeve 28 is engaged through an internal track roller 29 with track member 36 and is slidably movable independently of the cascade vane panels 26 when the primary sleeve assembly 38 is in the aft position.

FIGS. 1, 2 and 3 show the nozzle-reverser concept of the invention in its three operating modes respectively: the cruise position with the large nozzle exhaust area; the low speed position with the small nozzle exhaust area; and the thrust reverser position.

The major components are: the telescoping primary sleeve assembly 38 comprising the outer aft wall 22 of the nozzle, with a cascade vane ring attached thereto at its forward edge; a secondary sleeve or cascade vane cover 28 which is a cylindrical shell located inside the cascade vane ring; blocker doors 30 hinged off the primary sleeve assembly 38 and connected to the secondary sleeve 28 by blocker door arm 54 and link 52; and a stationary plug centerbody 34. For translating the primary sleeve assembly 38, dual actuators 42 which are housed within the wall of the nacelle 21, are utilized. The actuators 42, are of a ballscrew, dual ball-nut, mechanically sequenced type actuator and are driven by rotary prime movers (not shown) such as pneumatic, hydraulic, or electric motors. Also, they could be driven by a direct power takeoff from an engine accessory gear box and synchronized through angle gear boxes and flexible shafts. The actuators 42 comprise a clutch 44 with a ballscrew 46. The ballscrew 46 is attached at its aft end to the cylindrical sleeve of the cascade vane panels 26. The ballscrew 46 is held non-rotating through a spline arrangement. A rotating ballnut 48 is stationarily connected to fixed nacelle structure and a non-rotating ballnut 50 is attached to the cascade vane cover 28. Basically there are two modes of operation. First, for the "Cruise" to "Low Speed" operation, the entire primary sleeve assembly 38 and the secondary sleeve or cascade vane cover 28 are translated aft together from their stowed or cruise position shown in FIG. 1 to the low speed and sound suppression position shown in FIG. 2. This is accomplished by rotating ballnut 48 which translates ballscrew 46 linearly aft, thereby pushing both the cascade vane panels 26 and the cover 28 aft. Secondly, for the "Low Speed" to "Reverse Thrust" operation, the secondary sleeve or cascade vane cover 28 is translated relative to the cascade vanes 26 from the position shown in FIG. 2 to the retracted position shown in FIG. 3, by the clutch 44 engaging into ballnut 48 and disengaging ballscrew 46 from the splines. Thereby, ballscrew 46 starts to rotate with the rotating ballnut 48 and translates the non-rotating ballnut 50 linearly forward, with the cascade vane cover 28; while the linearly stationary ballscrew 46 holds the cascade vane panels 26 in the aft position. Also, for the reverse thrust operation, the forward movement of the cover 28, relative to the cascade vanes 26, actuates the blocker door 30 through link 52 and arm 54 fixed to the blocker door 30, to block the flow aft and turn the exhaust gases through the cascade vanes 26 for reverse thrust. Other type sequenced actuators, such as dual sequenced hydraulic, pneumatic or electrical actuators may also be used.

An additional embodiment of the present invention, is that in combination with the aft movement of the outer nozzle wall 22, during the low speed mode of airplane operation, a series of struts 32 that have been covered with acoustical material, are deployed radially inward into the annular exhaust duct for additional noise attenuation of the nozzle arrangement.

The sound suppressor struts 32 are pivotally mounted at 33 to the fixed plug centerbody 34 and are pivoted radially outward therefrom through links 56, 52 and blocker door arm 54, to split up the fluid flow in the exhaust duct and provide a beneficial effect on certain ranges of the noise spectrum. As more clearly shown in FIG. 4, the strut 32 has a certain thickness and comprises three walls: a solid center wall; and two external walls having holes drilled into them for providing resonating chambers.

The drag increment of the struts 32, when inwardly deployed within the duct, is minimal. As shown in FIG. 2, this is because of the increased exhaust nozzle area 24A, when the nozzle wall 22 is positioned aft at the low speed mode and the aircraft is flown at its low takeoff and landing speeds.

Figure 6:
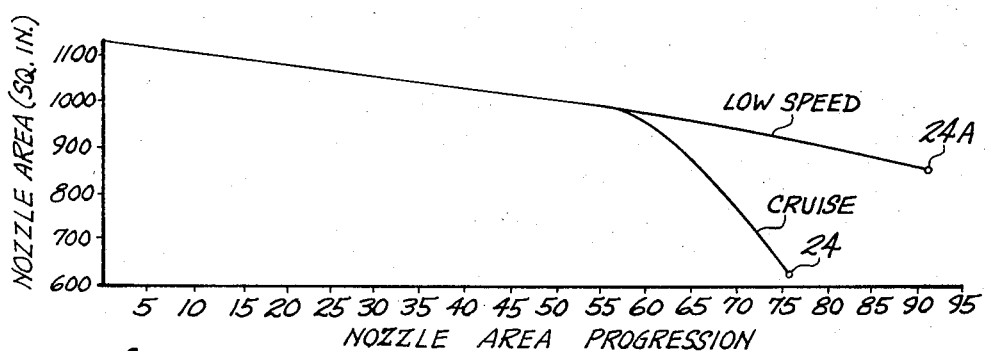
FIG. 6 is a graph of the cross-sectional area within the duct of the exhaust nozzle from the engine section to the nozzle exit plane.

FIG. 6 depicts graphically the cross-sectional area variation within the exhaust duct, from the engine aft turbine section 20 to the exhaust nozzle exit plane 25. In order for a subsonic nozzle to be effective, the rearward flow of fluid within the duct should be consistently convergent ot its nozzle exit plane. There should not be both convergency and divergency of fluid flow within the duct. Therefore, for both the high speed cruise mode, FIG. 1, with a small nozzle exit area 24, and the low speed takeoff and landing mode, FIG. 2, with the relatively larger exit area 24A, the area variation from the engine section to the exhaust nozzle exit, should be convergent. This is achieved by careful tailoring of both the centerbody plug 34 and the inner surface of the exhaust duct so as to have a consistent area progression convergency whether you go to the cruise nozzle exhaust area 24, or to the low speed mode with the relatively larger exhaust nozzle area 24A. However, there appears to be a discrepancy in the cross-sectional area variation within the nozzle duct from the engine section to the exhaust nozzle exit, between the graph in FIG. 6 and FIGS. 1 and 2. In the center of the exhaust duct is a fixed plug 34, and when the aft wall 22 of the nozzle is forward in its stowed position for high speed cruise, as shown in FIG. 1, it appears from the drawing that there is a convergency of the fluid flow to a reduced cross-sectional area. Whereas, when the aft wall 22 of the nozzle is translated aft to its low speed position, as shown in FIG. 2, the drawing appears to depict at first a convergency of fluid flow and then a divergency to the nozzle exit. This is an optical illusion in the annular exhaust duct illustration shown, as opposed to a rectangular duct illustration, because in the annular duct, the annulus cross-sectional area or washer like area, is determined by the difference in area between the fixed plug centerbody 34 and the inner diameter of the exhaust duct, which area difference varies as the square of the radius. Therefore, the diameter of the centerbody 34 can vary much more drastically than that of the duct diameter without significantly affecting the annulus area. By translating a centerbody within a fixed contour duct, there is a less noticeable overall effect in the change of the cross-sectional flow area within the duct, since a variation in the diameter of the centerbody produces a minimal inner area change in comparison to what a slight change in the outer diameter of the flow annulus would make. Whereas in the present invention, by translating the primary sleeve 22 of the exhaust duct, as opposed to translating a centerbody, there is a greater overall effect in the increase or decrease of the flow annulus volume in the duct; especially, in a consistently converging fluid flow for providing an effective subsonic nozzle. Another additional benefit from this arrangement is that with the aft extension of the primary sleeve 22 for the low speed mode, as shown in FIG. 2, the overall duct length is increased. This is also shown in FIG. 6. With an acoustic lining on the inner surface of the secondary telescopic sleeve 28 of the exhaust duct, which covers up the inner surface of the cascade vanes 26, the longer acoustically lined exhaust duct provides a greater noise suppression capability. Whereas, for a non-extensible exhaust duct structure with a translating centerbody, the overall length of the duct would remain the same with no increase in noise suppression capability. Therefore, in the present invention, by extending the length of the exhaust duct, the following is achieved: a greater exhaust nozzle exit area; an increased length of acoustic treatment; and arming of the thrust reversing mechanism.

Figure 7:
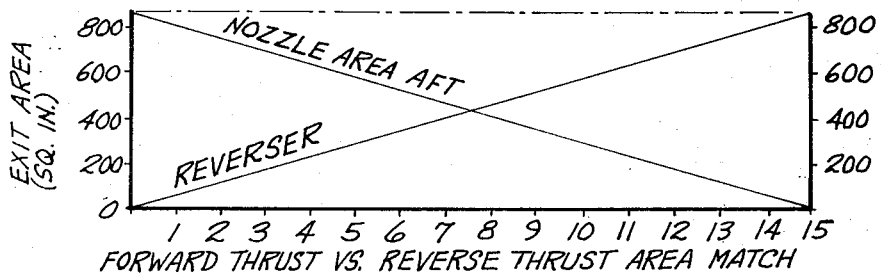
FIG. 7 is a graph of the thrust reverser area match.

FIG. 7 is a Reverser Area Match graph which illustrates that as the blocker door 30 is actuated to close due to the forward movement of the cascade vane cover 28, there is a predetermined amount of peripheral area that is exposed so that the degree of choking of the aft exit gases is proportional to opening up the cascade vane area in order that the engine operating cycle is not affected, which could cause it to stall.

While the invention has been disclosed with reference to a presently preferred embodiment, it is to be

What is claimed is:

1. Apparatus for varying the exit area of a jet engine discharge nozzle and for attenuating the noise therefrom, comprising: a sleeve forming the outer aft wall section of the discharge nozzle and mounted for telescopic movement; a center-body stationarily mounted within the discharge nozzle and having an external surface contour in combination with the interior surface of the discharge nozzle for forming a converging flow area to the discharge nozzle exit; means for extending the sleeve aft to increase the length and internal area of the discharge nozzle and to increase the discharge nozzle exit area; an acoustically treated strut hinged to the centerbody; and means connecting the strut to the sleeve such that the strut is deployed to extend into the exhaust flow upon aft translation of the sleeve for providing noise attenuation.

2. Apparatus for varying the exit area of a jet engine discharge nozzle and for attenuating the noise therefrom, comprising: a primary sleeve forming the outer aft wall section of the discharge nozzle and mounted thereto for telescopic movement; said primary sleeve having a cascade vane ring attached at its upstream end; said cascade vane ring comprising a circumferential series of cascade vane panels arranged in a substantially continuous circumferential hoop tension member, and being housed within the nozzle wall when the primary sleeve is at its forward stowed position; a secondary sleeve having an acoustically lined interior surface disposed inside the cascade vane ring to form an inner cover therefore; a centerbody stationarily mounted within the discharge nozzle and having an external surface contour in combination with the interior surface of the discharge nozzle for forming a converging flow area to the discharge nozzle exit; means for simultaneously translating the primary and secondary sleeve aft to increase the discharge nozzle exit area while maintaining flow area convergency to the discharge nozzle exit, and to increase the length and internal area of the discharge nozzle, and expose the acoustically lined interior surface of the secondary sleeve for noise attenuation.

3. The apparatus as set forth in claim 2, further comprising: an acoustically treated strut hinged to the centerbody; and means connecting the strut to the sleeve such that the strut is deployed to extend into the exhaust flow upon aft translation of the sleeve, for providing noise attenuation.

4. Apparatus for varying the exit area of a jet engine discharge nozzle for reversing the flow thereof, comprising: a primary sleeve forming the outer aft wall of the discharge nozzle and mounted for telescopic movement; said primary sleeve having a cascade vane ring attached at its upstream end; a secondary sleeve disposed inside the cascade vane ring and forming an inner cover therefore; a centerbody stationarily mounted within the discharge nozzle; means for translating the primary and secondary sleeve aft to increase the nozzle exit area; a blocker door hinged to the primary sleeve and connected to the secondary sleeve such that a relative extending motion between the two sleeves, actuates the blocker door radially inward toward the centerbody; and means for translating the secondary sleeve forward relative to the primary sleeve to uncover the cascade vanes and actuate the blocker door to block the exhaust flow so as to turn the flow through the cascade vanes for reversing the thrust.

5. Apparatus for varying the exit area of a jet engine discharge nozzle, for attenuating the noise therefrom, and for reversing the flow thereof, comprising: a primary sleeve forming the outer aft wall section of the discharge nozzle and mounted thereto for telescopic movement; said primary sleeve having a cascade vane ring attached at its upstream end; said cascade vane ring comprising a circumferential series of cascade vane panels arranged in a substantially continuous circumferential hoop tension member, and being housed within the nozzle wall when the primary sleeve is at its forward stowed position; a secondary sleeve having an acoustically lined interior surface disposed inside the cascade vane ring to form an inner cover therefore; a centerbody stationarily mounted within the discharge nozzle and having an external surface contour in combination with the interior surface of the discharge nozzle for forming a converging flow area to the discharge nozzle eixt; means for simultaneously translating the primary and secondary sleeve aft to increase the discharge nozzle exit area while maintaining flow area convergency to the discharge nozzle exit, and to increase the length and internal area of the discharge nozzle, and to expose the acoustically lined interior surface of the secondary sleeve for noise attenuation; a plurality of blocker doors hinged to the primary sleeve in a substantially continuous circumferential series arrangement, and connected to the secondary sleeve such that a relative extending motion between the two sleeves, actuates the blocker doors radially inward toward the centerbody; and means for translating the secondary sleeve forward to the primary sleeve to uncover the cascade vanes and actuate the blocker doors to block the exhaust flow so as to turn the flow through the cascade vanes for thrust reversing.

6. The apparatus as set forth in claim 5, further comprising: a plurality of acoustically treated struts hinged to the centerbody; and means connecting the struts to the primary sleeve such that they are deployed to extend into the exhaust flow upon aft translation of the primary sleeve, for providing noise attenuation.

* * * * *